United States Patent
Shieh et al.

(10) Patent No.: US 10,026,013 B2
(45) Date of Patent: Jul. 17, 2018

(54) CLUSTERING METHOD WITH A TWO-STAGE LOCAL BINARY PATTERN AND AN ITERATIVE IMAGE TESTING SYSTEM THEREOF

(71) Applicants: NCKU Research and Development Foundation, Tainan (TW); Himax Technologies Limited, Tainan (TW)

(72) Inventors: Ming-Der Shieh, Tainan (TW); Fang-Kai Hsu, Tainan (TW); Chun-Wei Chen, Tainan (TW); Der-Wei Yang, Tainan (TW)

(73) Assignees: NCKU Research and Development Foundation, Tainan (TW); Himax Technologies Limited, Tainan (TW)

( * ) Notice: Subject to any disclaimer, the term of this patent is extended or adjusted under 35 U.S.C. 154(b) by 118 days.

(21) Appl. No.: 15/272,186

(22) Filed: Sep. 21, 2016

(65) Prior Publication Data

US 2018/0082149 A1    Mar. 22, 2018

(51) Int. Cl.
*G06K 9/62* (2006.01)
*G06T 3/40* (2006.01)
*G06T 7/20* (2017.01)

(52) U.S. Cl.
CPC .......... *G06K 9/6221* (2013.01); *G06T 3/4076* (2013.01); *G06T 7/2013* (2013.01); *G06T 7/2066* (2013.01); *G06T 2207/20021* (2013.01)

(58) Field of Classification Search
CPC ... G06K 9/6221; G06T 3/4076; G06T 7/2066; G06T 7/2013; G06T 2207/20021
See application file for complete search history.

(56) References Cited

PUBLICATIONS

Chen, Chun-Wei, et al. "Fast model searching and combining for example learning-based super-resolution." Circuits and Systems (ISCAS), 2016 IEEE International Symposium on. IEEE, 2016.*

\* cited by examiner

*Primary Examiner* — Bhavesh Mehta
*Assistant Examiner* — Menatoallah Youssef
(74) *Attorney, Agent, or Firm* — Donald E. Stout; Stout, Uxa & Buyan, LLP

(57) ABSTRACT

A clustering method with a two-stage local binary pattern includes generating a gradient direction value according to a center sub-block and neighbor sub-blocks of a patch of an image; quantizing the gradient direction value, thereby generating a quantized gradient direction value; generating a gradient magnitude value according to the gradient direction value; quantizing the gradient magnitude value, thereby generating a quantized gradient magnitude value; concatenating the quantized gradient direction value and the quantized gradient magnitude value to generate a two-stage local binary pattern (2SLBP) value; and performing clustering of super-resolution imaging by using the 2SLBP value as an index.

9 Claims, 4 Drawing Sheets $01200100_3 = 1224_{10}$

CLUSTERING METHOD WITH A TWO-STAGE LOCAL BINARY PATTERN AND AN ITERATIVE IMAGE TESTING SYSTEM THEREOF

BACKGROUND OF THE INVENTION

1. Field of the Invention

The present invention generally relates to super-resolution (SR), and more particularly to a clustering method with a two-stage local binary pattern (2SLBP) and an iterative image testing system thereof.

2. Description of Related Art

High-definition displays grow rapidly nowadays. However, there are abundant image capturing devices, for example, surveillance devices, that produce low-resolution images. To fill this gap, super-resolution (SR) techniques have been proposed. Example-based super resolution is one of the SR techniques that predicts a high-resolution (HR) image by searching high-resolution patches in a patch database, and replaces a corresponding low-resolution (LR) sub-block of a low-resolution input image with a retrieved high-resolution patch.

In this specification, "high-resolution" and "low-resolution" are terms used relative to each other. Therefore, a "high-resolution" image refers to any suitable image having a higher resolution than an image referred to as a "low-resolution" image.

In order to reduce the size of the patch database, coefficients (or descriptors) of a mapping function, instead of HR patches themselves, are commonly stored in the patch database by using regression technique.

Local binary pattern (LBP) is a type of visual descriptor that is conventionally used to describe local geometry of a patch in the patch database in order to group together the patches that look the same or having similar visual properties. However, the conventional LBP disadvantageously results in abundant rarely occurring clusters (e.g., with usage less than 0.001% of total), therefore making redundancy for storage. Therefore, a need has thus arisen to propose a novel method to improve on clustering.

SUMMARY OF THE INVENTION

In view of the foregoing, it is an object of the embodiment of the present invention to provide a clustering method with a two-stage local binary pattern (2SLBP) and an iterative image testing system thereof that are capable of substantially reducing rarely occurring clusters, therefore preventing redundancy or wasting of storage and enhancing strength of super-resolution (SR) imaging tasks.

According to one embodiment, an image is divided into a plurality of patches. A gradient direction value is generated according to a center sub-block and neighbor sub-blocks of the patch; and the gradient direction value is quantized, thereby generating a quantized gradient direction value. A gradient magnitude value is generated according to the gradient direction value; and the gradient magnitude value is quantized, thereby generating a quantized gradient magnitude value. The quantized gradient direction value and the quantized gradient magnitude value are concatenated to generate a two-stage local binary pattern (2SLBP) value, which is used as an index to perform clustering of super-resolution imaging.

According to another embodiment, an iterative image testing system based on a two-stage local binary pattern (2SLBP) for super-resolution imaging includes an interpolation device that receives a low-resolution input image and accordingly generates an interpolated pixel within a patch of the input image; a clustering device for generating a two-stage local binary pattern (2SLBP) value as an index; a mapping device that stores a plurality of function tables, each including plural mapping functions, one of which is retrieved according to the index; and a prediction device that maps the interpolated pixel to an enhanced pixel according to the retrieved mapping function, thereby generating a high-resolution output image. Moreover, the patch with the enhanced pixel is fed back to go through the clustering device, the mapping device and the prediction device at least one time to generate an updated enhanced pixel, therefore refining the output image.

DETAILED DESCRIPTION OF THE INVENTION

Figure 1:
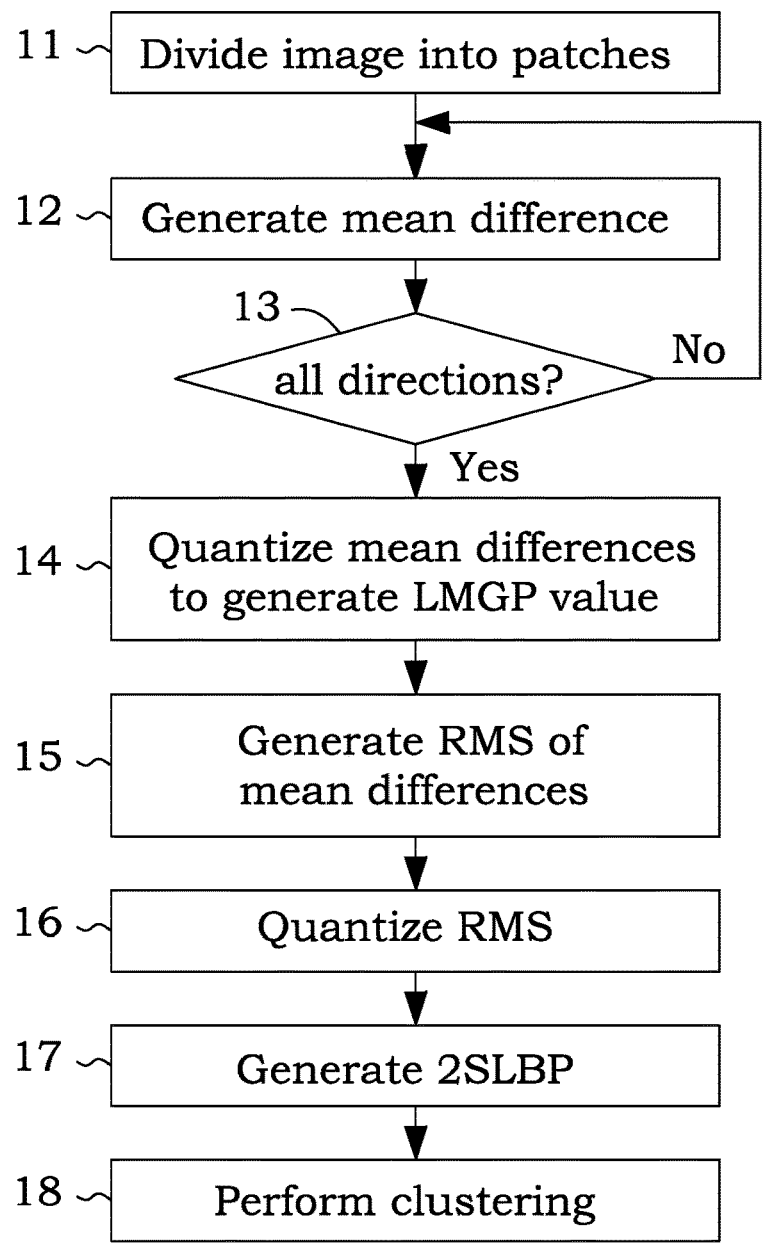
FIG. 1 shows a flow diagram illustrated of a clustering method with a two-stage local binary pattern (2SLBP) according to one embodiment of the present invention.

FIG. 1 shows a flow diagram illustrated of a clustering method 100 with a two-stage local binary pattern (2SLBP) according to one embodiment of the present invention. The clustering method 100 may be adaptable to performing imaging tasks (for example, training and testing) on image signals for super-resolution (SR) such as example-based super resolution. The steps of the clustering method 100 may be performed by an electronic circuit such as a digital image processor, and the super-resolution imaging task may be implemented by hardware, software or their combinations.

Figure 2A:
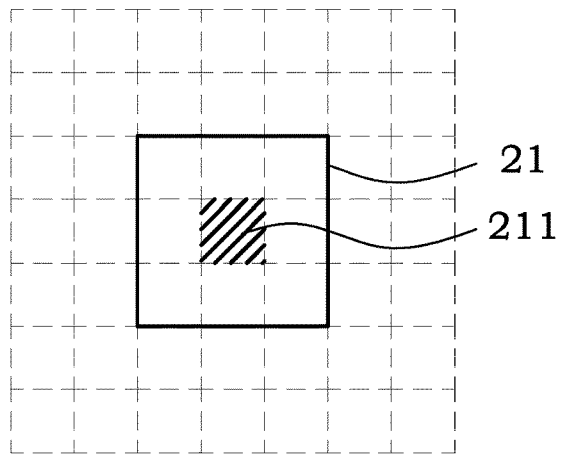
FIG. 2A to FIG. 2C demonstrate generating mean differences between neighbor sub-blocks and a center sub-block.

In step 11, an image subject to clustering is divided into patches with a predetermined size (e.g., 7×7). FIG. 2A shows an exemplary patch with a size of 7×7. FIG. 2A also shows a center sub-block 21 (e.g., with a size of 3×3) having a center pixel 211 located in the middle of the patch.

In step 12, a gradient direction value is generated. In one embodiment, a mean difference value (abbreviated as "mean difference" hereinafter) between a neighbor sub-block and the center sub-block 21 is generated to represent the direction of a gradient between the neighbor sub-block and the center sub-block 21. Specifically, the mean of the neighbor sub-block is computed, and the mean of the center sub-block 21 is computed. Subsequently, the mean difference is generated by subtracting the mean of the center sub-block 21 from the mean of the neighbor sub-block. In one embodiment, a weighted mean of the neighbor sub-block and a weighted mean of the center sub-block are generated instead.

Figure 2B:
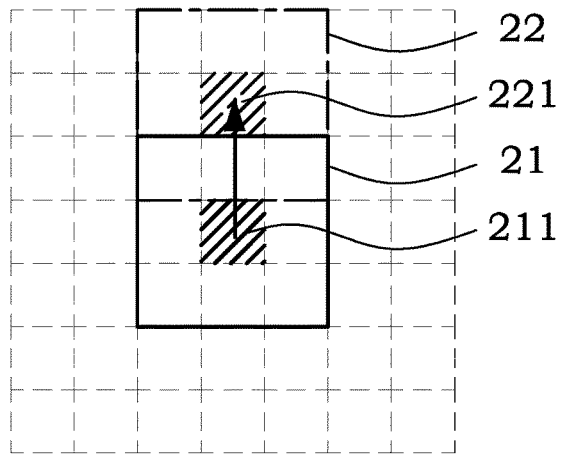

FIG. 2B further shows a neighbor sub-block 22 (with the same size of 3×3) having a center pixel 221 located upper-middle to the center sub-block 21. It is noted that the mean difference between the neighbor sub-block 22 and the center sub-block 21 is indicated by an arrow, which represents the direction of a gradient between the two sub-blocks 22 and 21.

Figure 2C:
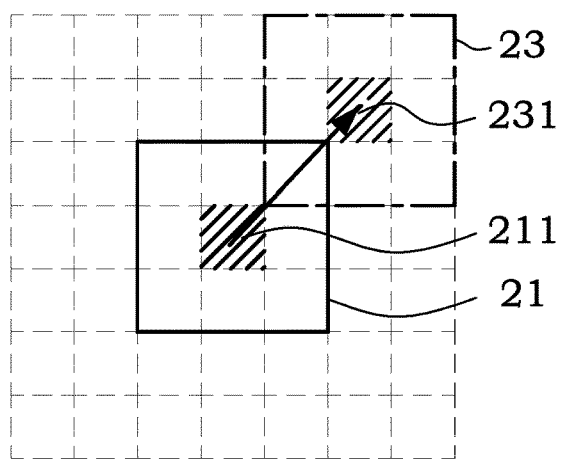

Step 22 as described above is repeated for other directions (e.g., upper-right, right, lower-right, lower-middle, lower-left, left and upper-left) until all directions or predetermined portion of all direction have been exhausted (step 13). FIG. 2C further shows a neighbor sub-block 23 (with the same size of 3×3) having a center pixel 231 located upper-right to the center sub-block 21. It is noted that the mean difference between the neighbor sub-block 23 and the center sub-block 21 is indicated by an arrow, which represents the direction of a gradient between the two sub-blocks 23 and 21.

In step 14, the mean differences generated from step 12 are quantized to generate a local multi-gradient level pattern (LMGP) value (or a quantized gradient direction value). For example, mean differences between eight neighbor sub-blocks and the center sub-block 21 are quantized. Accordingly, this gives an 8-digit number. In one exemplary embodiment, the mean differences are quantized into one of three quantization levels 0, 1 or 2, therefore resulting in a ternary number. The generation of the mean differences and the quantization thereof may be expressed as follows:

$$LMPG = \sum_{k=0}^{k=D-1} f\left(\frac{\sum_{o=1}^{o=9} w_o \times P_o - \sum_{c=1}^{c=9} w_c \times P_c}{\sum_{i=1}^{i=9} w_i}\right) \cdot 3^k, \quad f(x) = \begin{cases} 2, & x > \theta \\ 1, & -\theta \le x \le \theta \\ 0, & x < -\theta \end{cases}$$

where $w_o$, $w_c$ and $w_i$ are weightings, $P_o$ is a pixel value of the neighbor sub-blocks 22/23, $P_c$ is a pixel value of the center sub-block 21, and $\theta$ is a predetermined threshold.

Figures 3A, 3B, 3C:
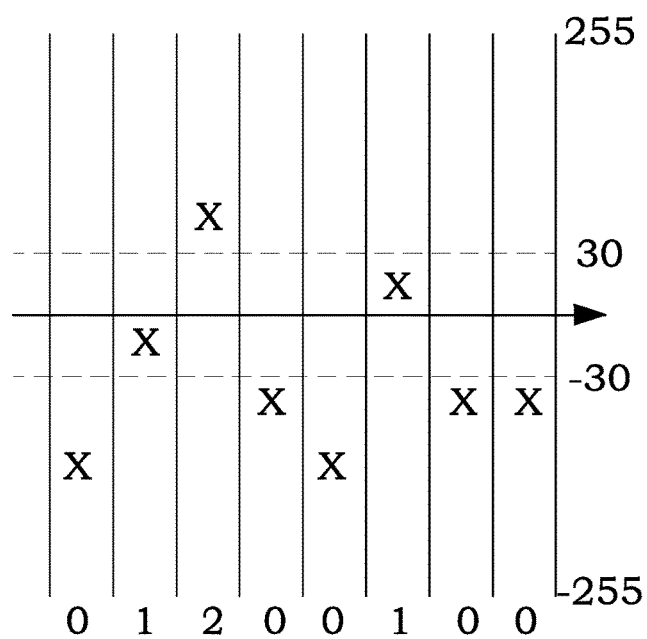
FIG. 3A schematically shows exemplary mean values of the center sub-block and the neighbor sub-blocks.
FIG. 3B graphically shows mean differences associated with corresponding gradients.
FIG. 3C schematically shows quantized mean differences associated with corresponding gradients.

FIG. 3A schematically shows exemplary mean values of the center sub-block 21 and the neighbor sub-blocks 22/23. FIG. 3B graphically shows mean differences associated with corresponding gradients with threshold $\theta$ of 30. FIG. 3C schematically shows quantized mean differences associated with corresponding gradients. The resultant LMGP value may be represented as 01200100 in ternary, which is equivalent to decimal 1224.

In step 15, a gradient magnitude value is generated to represent the magnitude of gradients between the neighbor sub-blocks 22/23 and the center sub-block 21. In one embodiment, a root mean square (RMS) of the mean differences is generated. In other words, the square root of the arithmetic mean of the squares of the mean differences is generated.

In step 16, the root mean square (RMS) of the mean differences (i.e., gradient magnitude value) generated from step 15 are quantized to generate a quantized gradient magnitude value. In one exemplary embodiment, the generation of the root mean square (RMS) of the mean differences and the quantization thereof may be expressed as follows:

$$C_M = f\left(\sqrt{\frac{1}{8}\sum_{k=0}^{7}(p_k - p_c)^2}\right), \quad f(x) = \begin{cases} T-1, & x > \Psi_1 \\ T-2, & \Psi_2 < x \le \Psi_1 \\ \vdots \\ 0, & x \le \Psi_{T-1} \end{cases}$$

where $p_k$ is a mean value of a neighbor sub-block 22/23, $p_c$ is a mean value of the center sub-block 21, and $\Psi_1$, $\Psi_2$, $\Psi_{T-1}$ are predetermined thresholds.

In step 17, the LMGP value (LMGP) generated in step 14 (i.e., the first stage) and the quantized gradient magnitude value ($C_M$) generated in step 16 (i.e., the second stage) are concatenated (or joined) to generate a two-stage local binary pattern (2SLBP) value. In one embodiment, the digits of the quantized gradient magnitude value ($C_M$) are more significant than the digits of the LMGP value (LMGP). The 2SLBP value generated in step 17 may be used as an index in performing clustering (step 18) of the super-resolution (SR) imaging tasks (for example, training and testing).

According to the clustering method 100 as described above, as the gradient direction and the gradient magnitude are separately generated and quantized, the resultant index for performing clustering is more robust than conventional counterparts. For example, rarely occurring clusters (e.g., with usage less than 0.001% of total) using the clustering method 100 of the present embodiment may be substantially reduced compared to the conventional counterparts, therefore preventing redundancy or wasting of storage and enhancing strength of super-resolution (SR) imaging tasks.

Figure 4:
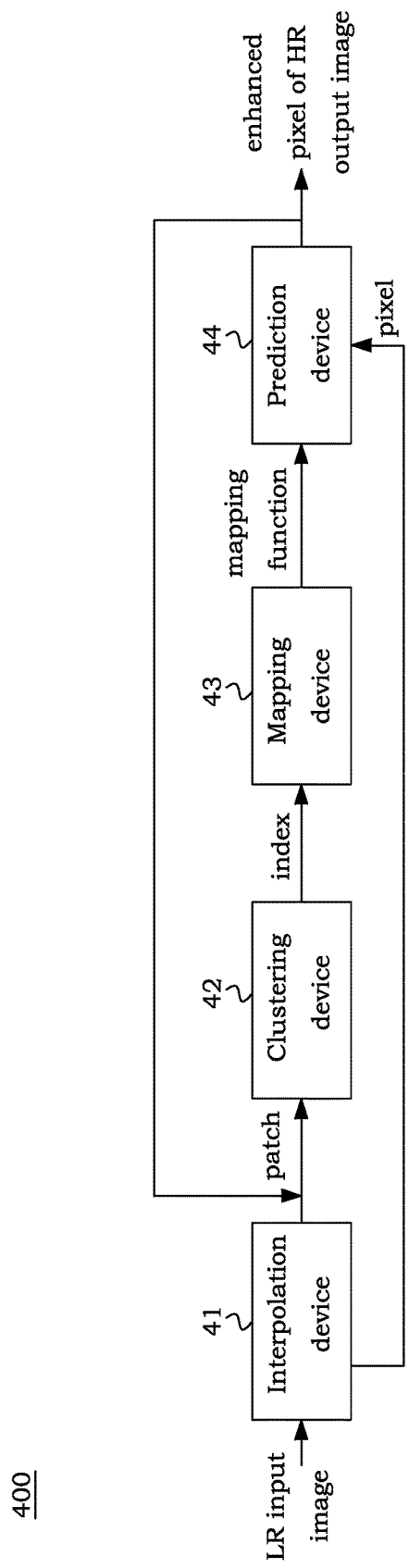
FIG. 4 shows a block diagram illustrated of an image testing system based on a two-stage local binary pattern (2SLBP) for super-resolution (SR) imaging according to one embodiment of the present invention.

FIG. 4 shows a block diagram illustrated of an iterative image testing system 400 based on a two-stage local binary pattern (2SLBP) for super-resolution (SR) imaging according to one embodiment of the present invention. The blocks of the image testing system 400 may be implemented by hardware, software or their combinations.

In the embodiment, the iterative image testing system 400 may include an interpolation device 41 that is coupled to receive a low-resolution (LR) input image, and is configured to generate an interpolated pixel within a patch (e.g., with a size of 7×7). A suitable interpolation method, such as Bicubic interpolation, may be used in the interpolation device 41. A patch with the interpolated pixel is then subject to clustering based on the two-stage local binary pattern (2SLBP) by a clustering device 42 performing steps as illustrated in FIG. 1, therefore generating an index.

In one embodiment, the patch with the interpolated pixel is normalized before the patch is subject to clustering by the clustering device 42. For example, luminance normalization is performed by subtracting a patch mean from pixel values of the patch.

The iterative image testing system 400 may further include a mapping device 43 that includes a plurality of function tables, each including plural mapping functions that are commonly stored as matrix coefficients in a memory device of the mapping device 43. It is noted that the mapping functions are provided by an image training system (not shown) based on the two-stage local binary pattern (2SLBP). The image training system may be implemented by a conventional technique, which is thus omitted here for brevity. One mapping function among the provided mapping functions is then retrieved according to the index generated by the clustering device 42.

The iterative image testing system 400 may further include a prediction device 44 that is configured to map the interpolated pixel (generated by the interpolation device 41) to an enhanced pixel according to the retrieved mapping function (from the mapping device 43). Therefore, the enhanced pixel along with other pixels in the patch may form a high-resolution (HR) output image. It is noted that, according to the embodiment, the pixel subject to clustering is pre-interpolated (by the interpolation device 41), and image quality of the interpolated pixel is then enhanced (by the prediction device 44) rather than being scaled up.

If the patch is normalized (e.g., luminance normalization) before the patch is subject to clustering, the patch of the HR output image should be de-normalized (i.e., the reverse of normalization). For example, the patch mean should be added to pixel values of the patch of the HR output image.

According to one aspect of the embodiment, the patch with the enhanced pixel may be repeatedly (or iteratively) subject to the image training system (not shown) to provide an updated function table including plural mapping functions. As shown in FIG. 4, the patch with the enhanced pixel is then fed back to go through the clustering device 42, the mapping device 43 and the prediction device 44 to generate an updated enhanced pixel, therefore refining the high-resolution (HR) output image. The iteration of the embodiment may be executed a predetermined number of times, each time with a refined updated function table. In practice, as the image training system is commonly offline and the iterative image testing system 400 is ordinarily online, the plurality of updated function tables may thus be stored in the memory device of the mapping device 43 as a whole, and each iteration may be executed with a corresponding updated function table.

Although specific embodiments have been illustrated and described, it will be appreciated by those skilled in the art that various modifications may be made without departing from the scope of the present invention, which is intended to be limited solely by the appended claims.

What is claimed is:

1. An iterative image testing system based on a two-stage local binary pattern (2SLBP) for super-resolution imaging, the system comprising:
    an interpolation device that receives a low-resolution input image and accordingly generates an interpolated pixel within a patch of the input image;
    a clustering device performing the following steps:
        generating a plurality of gradient direction values according to a center sub-block and neighbor sub-blocks of the patch;
        quantizing the gradient direction values, thereby generating a quantized gradient direction value;
        generating a gradient magnitude value according to the gradient direction values;
        quantizing the gradient magnitude value, thereby generating a quantized gradient magnitude value; and
        concatenating the quantized gradient direction value and the quantized gradient magnitude value to generate a two-stage local binary pattern (2SLBP) value as an index;
    a mapping device that stores a plurality of function tables, each including plural mapping functions, one of which is retrieved according to the index; and
    a prediction device that maps the interpolated pixel to an enhanced pixel according to the retrieved mapping function, thereby generating a high-resolution output image.

2. The system of claim 1, wherein the plurality of gradient direction values are generated by the following steps:
    generating a mean difference between a neighbor sub-block and the center sub-block along a direction; and
    repeating the step of generating the mean difference along other directions.

3. The system of claim 2, wherein the mean differences for all the directions are quantized into one of three quantization levels, thereby resulting in a ternary number.

4. The system of claim 3, wherein the gradient magnitude value is generated by the following step:
    generating a root mean square of the mean differences for all the directions to result in the gradient magnitude value.

5. The system of claim 1, wherein digits of the quantized gradient magnitude value are more significant than digits of the quantized gradient direction value.

6. The system of claim 1, wherein the patch with the interpolated pixel is normalized before the patch is processed by the clustering device.

7. The system of claim 6, wherein the patch of the output image is de-normalized.

8. The system of claim 1, wherein the patch with the enhanced pixel is fed back to go through the clustering device, the mapping device and the prediction device at least one time to generate an updated enhanced pixel, therefore refining the output image.

9. The system of claim 8, wherein each iteration of the patch with the enhanced pixel being fed back to go through the clustering device, the mapping device and the prediction device is executed with a corresponding updated function table stored in the mapping device.

* * * * *